United States Patent
Yamaguchi et al.

(10) Patent No.: US 7,611,801 B2
(45) Date of Patent: Nov. 3, 2009

(54) NON-AQUEOUS ELECTROLYTE, RECHARGEABLE LITHIUM BATTERY, AND RECHARGEABLE BATTERY SYSTEM

(75) Inventors: Takitaro Yamaguchi, Yokohama (JP); Ryuichi Shimizu, Yokohama (JP); Cheol-Soo Jung, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 317 days.

(21) Appl. No.: 11/250,264

(22) Filed: Oct. 13, 2005

(65) Prior Publication Data

US 2006/0078801 A1   Apr. 13, 2006

(30) Foreign Application Priority Data

Oct. 13, 2004  (JP)  ............................. 2004-298969
Jun. 8, 2005   (KR)  ..................... 10-2005-0048850

(51) Int. Cl.
*H01M 10/40*   (2006.01)
(52) U.S. Cl. .................. 429/199; 429/326; 429/188
(58) Field of Classification Search ............... 429/199, 429/326, 188
See application file for complete search history.

(56) References Cited

U.S. PATENT DOCUMENTS

| 5,763,119 | A   | 6/1998  | Adachi        |         |
|-----------|-----|---------|---------------|---------|
| 6,268,715 | B1* | 7/2001  | Oglesbee et al. | 320/156 |
| 6,495,293 | B1* | 12/2002 | Arai et al.   | 429/307 |
| 7,294,436 | B2  | 11/2007 | Abe et al.    |         |
| 2003/0180626 | A1* | 9/2003  | Shima et al.  | 429/326 |
| 2003/0190529 | A1* | 10/2003 | Kim et al.    | 429/307 |
| 2004/0043300 | A1* | 3/2004  | Utsugi et al. | 429/329 |

FOREIGN PATENT DOCUMENTS

| JP | 9-167635       |   | 6/1997  |
|----|----------------|---|---------|
| JP | 2002343436 A   | * | 11/2002 |
| KR | 2002-0088048   |   | 11/2002 |
| KR | 2003-0015709   |   | 2/2003  |
| KR | 2003-0057321   |   | 7/2003  |
| KR | 2003-0078891   |   | 10/2003 |
| KR | 10-0423227     |   | 6/2004  |

OTHER PUBLICATIONS

Korean Patent Abstracts, Publication No. 1020020088048 A, dated Nov. 25, 2002, in the name of Junichi Arai et al.
Korean Patent Abstracts, Publication No. 1020030057321 A, dated Jul. 4, 2003, in the name of Akio Hiwara et al.
Korean Patent Abstracts, Publication No. 1020030015709 A; Date of Publication: Feb. 25, 2003; in the name of Hyeong Gon Noh.
Patent Abstracts of Japan, Publication No. 09-167635; Publication Date Jun. 24, 1997; in the name of Hibara, et al.

* cited by examiner

*Primary Examiner*—Jane Rhee
(74) *Attorney, Agent, or Firm*—Christie, Parker & Hale, LLP (57) ABSTRACT

A non-aqueous electrolyte having improved lithium ion conductivity and excellent voltage resistance is provided. A lithium rechargeable battery and a rechargeable battery system including the inventive non-aqueous electrolyte is also provided. The non-aqueous electrolyte includes at least one aromatic compound which is polymerizable at a working electrode potential of 4.2 to 4.5 V when a lithium metal is used as a counter electrode and platinum is used as a working electrode.

14 Claims, 2 Drawing Sheets

NON-AQUEOUS ELECTROLYTE, RECHARGEABLE LITHIUM BATTERY, AND RECHARGEABLE BATTERY SYSTEM

CROSS-REFERENCE TO RELATED APPLICATION

This application claims priority to and the benefit of Japanese Application No. 2004-298969 filed with the Japanese Patent Office on Oct. 13, 2004 and Korean Patent Application No. 10-2005-0048850 filed with the Korean Intellectual Property Office on Jun. 8, 2005, the entire contents of which are incorporated herein by reference.

FIELD OF THE INVENTION

The present invention relates to a non-aqueous electrolyte for a lithium rechargeable battery, a lithium rechargeable battery, and a rechargeable battery system.

BACKGROUND OF THE INVENTION

Conventional lithium rechargeable batteries generally have charge cut-off voltages of about 4.2 V (vs. Li) depending on the oxidation resistance of the non-aqueous electrolyte. When charged to over 4.2 V (vs. Li), the positive electrode potential increases, thereby decomposing the non-aqueous electrolyte. Accordingly, the cycle and battery characteristics of the lithium rechargeable battery deteriorate at high temperatures. However, lithium rechargeable batteries have improved energy density at charging voltages of over 4.2 V and average operating voltages are also increased.

Recently, a non-aqueous electrolyte with high voltage resistance was disclosed in Japanese Patent laid-open No. 9-167635, the entire content of which is incorporated herein by reference. The high voltage resistant electrolyte was achieved by using a sulfurous acid ester and a halogenated alkyl group as the electrolyte solution. However, despite the improved voltage resistance of the electrolyte solution, lithium ion conductivity of the battery is drastically reduced.

SUMMARY OF THE INVENTION

In one exemplary embodiment of the present invention, a non-aqueous electrolyte has good lithium ion conductivity and excellent voltage-resistance. In another embodiment, a lithium rechargeable battery and a rechargeable battery system include the non-aqueous electrolyte.

According to one embodiment of the present invention, the non-aqueous electrolyte for a lithium rechargeable battery includes at least one aromatic compound which is polymerizable at a working electrode potential ranging from about 4.2 to about 4.5 V when lithium metal is used as the counter electrode and platinum is used as the working electrode. The aromatic compound in the non-aqueous electrolyte is polymerized on the surface of the positive electrode during initial charging to form a passivation film. The passivation film prevents direct contact between the positive electrode and the non-aqueous electrolyte. Accordingly, decomposition of the non-aqueous electrolyte due to oxidation is prevented and the voltage resistance of the non-aqueous electrolyte is improved. High temperature characteristics of the lithium rechargeable battery are also improved.

According to another embodiment of the present invention, the non-aqueous electrolyte includes at least one aromatic compound selected from the group consisting of phenanthrene, terphenyl and dimethylbiphenyl. Alternatively, the aromatic compound is selected from the group consisting of phenanthrene, terphenyl and mixtures thereof.

According to yet another embodiment of the present invention, the non-aqueous electrolyte for a lithium rechargeable battery includes at least one fluorinated organic compound selected from the group consisting of compounds represented by Formula 1, Formula 2 and combinations thereof.

$$R^1\text{—}O\text{—}R^2 \quad (1)$$

$$R^1\text{—}O\text{—}CO\text{—}O\text{—}R^2 \quad (2)$$

In Formulas 1 and 2, each of $R^1$ and $R^2$ is an alkyl group or a fluoro alkyl group. In one embodiment, at least one of $R^1$ and $R^2$ is a fluoro alkyl group.

The fluorinated organic compound does not decompose due to the oxidation of the positive electrode of the lithium rechargeable battery. Therefore, the fluorinated organic compound of the non-aqueous electrolyte imparts excellent voltage resistance.

In one embodiment, the fluorinated organic compound is selected from the group consisting of $HCF_2CF_2CH_2OCF_2CF_2H$, $CF_3CH_2OCOOCH_2CF_3$, $CH_3OCOOCH_2CHFCH_3$, $CH_3OCOOCH(CH_3)CH_2F$, $CH_3OCOOCH_2CH_2CH_2F$ and mixtures thereof. Alternatively, the fluorinated organic compound is selected from the group consisting of $HCF_2CF_2CH_2OCF_2CF_2H$, $CH_3OCOOCH_2CHFCH_3$ and mixtures thereof.

The non-aqueous electrolyte may further include at least one additive for improving the negative passivation film. The additive is selected from the group consisting of fluoroethylene carbonate, vinylene carbonate, propanesultone, trifluoropropylmethylsulfone, fluorobenzene, and $LiBF_4$.

The additive for improving the negative passivation film is used in addition to the aromatic compound or the fluorinated organic compound. The additive protects the film formed on the surface of the negative electrode in the lithium rechargeable battery, thereby preventing abrupt reactions between the negative electrode and the non-aqueous electrolyte which can occur during charging and discharging at high temperatures. Thermal runaway of the lithium rechargeable battery is also prevented.

According to another embodiment of the present invention, a lithium rechargeable battery includes the above described non-aqueous electrolyte.

Because the non-aqueous electrolyte has excellent voltage resistance, it does not decompose at battery voltages ranging from about 4.2 to about 4.5 V when fully charged. The lithium rechargeable battery has decreased thermal runaway at high temperatures, providing a stable battery with high capacity.

According to yet another embodiment, a rechargeable battery system includes the above-described lithium rechargeable battery and charging equipment. At full charge, the cell voltage ranges from about 4.2 to about 4.5 V.

Because the lithium rechargeable battery is fully charged to voltages ranging from about 4.2 to about 4.5 V, it does not decompose at battery voltages ranging from about 4.2 to about 4.5 V, even when fully charged. Therefore, thermal runaway at high temperatures is decreased, providing a stable lithium rechargeable battery having high capacity.

The present invention provides a non-aqueous electrolyte with excellent voltage resistance, and a lithium rechargeable battery and a rechargeable battery system including the non-aqueous electrolyte.

BRIEF DESCRIPTION OF THE DRAWINGS

The above and other features and advantages of the present invention will be better understood with reference to the following detailed description when considered in conjunction with the accompanying drawings, in which.

DETAILED DESCRIPTION OF THE INVENTION

In one embodiment of the present invention, a lithium rechargeable battery includes a positive electrode capable of intercalating and deintercalating lithium ions, a negative electrode capable of intercalating and deintercalating lithium ions, a separator positioned between the positive and negative electrodes, and a non-aqueous electrolyte.

Figure 1:
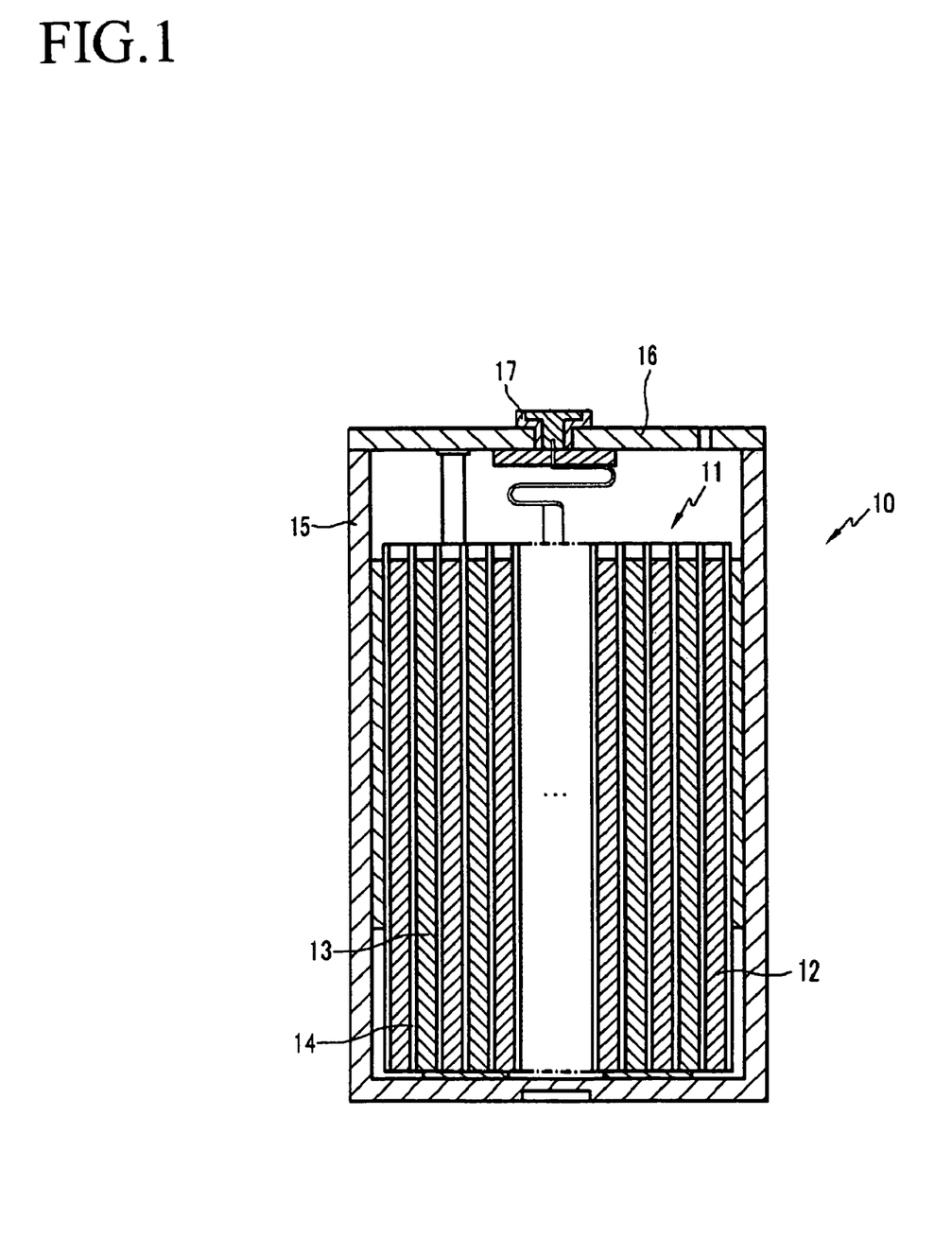
FIG. 1 is a cross-sectional view of a rechargeable battery according to one embodiment of the present invention.

FIG. 1 is a cross-sectional view of a rechargeable battery according to one embodiment of the present invention. As shown, the battery 10 includes an electrode assembly 11 comprising a positive electrode 12, a negative electrode 13, and a separator 14 positioned between the positive electrode 12 and the negative electrode 13. To fabricate the battery 10, the electrode assembly 11 is inserted into a battery case 15 and an electrolyte is injected into the battery 10 through the case 15. The battery 10 is then sealed with a cap plate 16 and gasket 17. It is understood that the lithium secondary battery according to the present invention is not limited to the shape shown in FIG. 1 and can take any suitable shape, such as a cylinder or a pouch.

One suitable positive electrode includes a mixture of a positive active material powder, a binder such as polyvinylidenefluoride, and a conductive agent such as carbon black. The positive active material is coated on a positive current collector. The positive electrode current collector includes a metal foil or metal net comprising a material such as aluminum or stainless steel.

The positive active material can include a composite oxide of lithium and at least one metal selected from the group consisting of cobalt, manganese, and nickel. Nonlimiting examples of suitable composite metal oxides include $LiMn_2O_4$, $LiCoO_2$, $LiNiO_2$, $LiCoNiMnO_2$, $LiFeO_2$, $V_2O_5$, and the like. In one embodiment, the composite metal oxide is selected from the group consisting of $LiCoO_2$, $LiNiO_2$, and $LiCoNiMnO_2$. Alternatively, the positive active material can include a compound capable of intercalating and deintercalating lithium ions, such as TiS, MoS, an organic disulfide compound, an organic polysulfide compound, and the like.

One suitable negative electrode includes a mixture of a negative active material powder, a binder such as polyvinylidenefluoride, and a conductive agent such as carbon black. The negative active material is coated on a negative current collector. The negative current collector includes a metal foil or a metal net comprising a material such as Cu or a Cu alloy.

Nonlimiting examples of suitable negative active materials include carbonaceous materials such as artificial graphite, natural graphite, graphitizable carbon fiber, graphitizable mesocarbon microbeads, amorphous carbon, and the like. The negative active material may include an elementary metal substance capable of alloying with lithium, or a composite of a metal material and a carbonaceous material. Nonlimiting examples of metals capable of alloying with lithium include Al, Si, Sn, Pb, Zn, Bi, In, Mg, Ga, Cd, and the like. The negative active material may alternatively comprise a lithium metal foil.

The separator may include any known separator material. For example, the separator may include a porous polypropylene film or a porous polyethylene film.

The non-aqueous electrolyte conducts lithium ions. In one embodiment, the electrolyte includes a non-aqueous solvent, a lithium salt, and a polymerizable aromatic compound.

The polymerizable aromatic compound polymerizes on a surface of the working electrode at a working electrode potential ranging from about 4.2 to about 4.5 V when lithium metal is used as the counter electrode and platinum is used as the working electrode. The polymerizable aromatic compound is selected from the group consisting of phenanthrene, terphenyl, dimethylbiphenyl, and mixtures thereof. In one embodiment, the polymerizable aromatic compound is selected from the group consisting of phenanthrene, terphenyl and mixtures thereof.

The aromatic compound in the non-aqueous electrolyte polymerizes on a surface of the positive electrode (working electrode) during initial charging to form a passivation film. The passivation film prevents direct contact between the positive electrode and the non-aqueous electrolyte. Accordingly, decomposition of the non-aqueous electrolyte due to oxidation of the positive electrode is prevented and the voltage resistance of the non-aqueous electrolyte is improved. High temperature characteristics of the lithium rechargeable battery are also improved.

The aromatic compound is present in the electrolyte in an amount ranging from about 0.01 to 5 weight % based on the total weight of the electrolyte. In another embodiment, the aromatic compound is present in the electrolyte in an amount ranging from about 0.1 to about 0.5 weight % based on the total weight of the non-aqueous electrolyte. When the amount of the aromatic compound is less than about 0.01 weight %, the passivation film formed on the surface of the positive electrode is insufficient, and decomposition of the electrolyte due to oxidation of the positive electrode is not prevented. When the amount of the aromatic compound is more than 5 weight %, the charge and discharge efficiency of the lithium rechargeable battery cannot be improved without deterioration of the lithium ion conductivity of the non-aqueous electrolyte.

According to another embodiment, the non-aqueous electrolyte of the present invention includes a non-aqueous solvent, a lithium salt, and at least one fluorinated organic compound selected from the group consisting of compounds represented by Formula 1, Formula 2 and mixtures thereof.

$$R^1-O-R^2 \quad (1)$$

$$R^1-O-CO-O-R^2 \quad (2)$$

In Formulas 1 and 2, each of $R^1$ and $R^2$ is an alkyl group or a fluoro alkyl group. Preferably, at least one of $R^1$ and $R^2$ is a fluoro alkyl group.

In one embodiment, the fluorinated organic compound is selected from the group consisting of $HCF_2CF_2CH_2OCF_2CF_2H$, $CF_3CH_2OCOOCH_2CF_3$, $CH_3OCOOCH_2CHFCH_3$, $CH_3OCOOCH(CH_3)CH_2F$, $CH_3OCOOCH_2CH_2CH_2F$ and mixtures thereof. In another embodiment, the fluorinated organic compound is selected from the group consisting of $HCF_2CF_2CH_2OCF_2CF_2H$, $CH_3OCOOCH_2CHFCH_3$ and mixtures thereof.

The fluorinated organic compound does not decompose due to the oxidation of the positive electrode of the lithium rechargeable battery. Therefore, the fluorinated organic compound of the non-aqueous electrolyte imparts excellent voltage resistance.

In one embodiment, the fluorinated organic compound is present in the non-aqueous electrolyte in an amount ranging from about 0.1 to about 50 weight % based on the total weight of the electrolyte. In another embodiment, the fluorinated organic compound is present in the non-aqueous electrolyte in an amount ranging from about 1 to about 20 weight % based on the total weight of the electrolyte. When the amount of fluorinated organic compound is less than about 0.1 weight %, it does not significantly improve the voltage resistance of the non-aqueous electrolyte and does not prevent decomposition of the electrolyte due to the oxidation of the positive electrode. When the amount of fluorinated organic compound is more than about 50 weight %, it does not improve the charge and discharge efficiency of the lithium rechargeable battery without deteriorating lithium ion conductivity.

In addition to either an aromatic compound or an fluorinated organic compound, the non-aqueous electrolyte may further include at least one additive for improving the negative passivation film. The additive is selected from the group consisting of fluoroethylene carbonate, vinylene carbonate, propanesultone, trifluoropropylmethylsulfone, fluorobenzene, $LiBF_4$ and mixtures thereof.

The additive for improving the negative passivation film protects the film formed on the surface of the negative electrode during charging and discharging of the lithium rechargeable battery. This prevents abrupt reactions between the negative electrode and the non-aqueous electrolyte which can occur during charging and discharging at high temperatures and prevents thermal runaway of the lithium rechargeable battery.

In one embodiment, the additive is present in the electrolyte in an amount ranging from about 0.05 to about 20 weight % based on the total weight of the electrolyte. In another embodiment, the additive is present in the electrolyte in an amount ranging from about 0.5 to about 10 weight % based on the total weight of the non-aqueous electrolyte. When the amount of the additive is less than 0.05 weight %, the film formed on the surface of the negative electrode is not sufficiently protected. When the amount of the additive is more than 20 weight %, the charge and discharge efficiency of the lithium rechargeable battery is not improved without deteriorating the lithium ion conductivity of the non-aqueous electrolyte.

The non-aqueous electrolyte may include a mixture of cyclic carbonates and linear carbonates as a solvent. Nonlimiting examples of suitable cyclic carbonates include ethylene carbonate, butylene carbonate, propylene carbonate, γ-butyrolactone and mixtures thereof. These cyclic carbonates increase the ion-conductivity of the electrolyte because they are easily solvated with lithium ions.

Nonlimiting examples of suitable linear carbonates include dimethyl carbonate, methyl ethyl carbonate, diethyl carbonate and mixtures thereof. These linear carbonates have low viscosities, enabling them to increase ion conductivity by decreasing the viscosity of the electrolyte. However, these linear carbonates also have low flash points and care must be taken not to add so much that the flash point of the electrolyte is decreased.

Nonlimiting examples of suitable lithium salts include $LiPF_6$, $LiBF_4$, $Li[N(SO_2C_2F_5)_2]$, $Li[B(OCOCF_3)_4]$ and $Li[B(OCOC_2F_5)_4]$. The lithium salt is present in the electrolyte in a concentration ranging from about 0.5 mol/L to about 2.0 mol/L. The lithium salt increased ion conductivity of the electrolyte.

The lithium rechargeable battery according to this embodiment has a non-aqueous electrolyte with excellent voltage resistance. The excellent voltage resistance of the electrolyte prevents decomposition of the electrolyte at full charge, ranging from about 4.2 to about 4.5 V, and prevents thermal runaway at high temperatures, yielding a stable battery with high capacity.

In another embodiment, a rechargeable battery system includes a lithium rechargeable battery and charging equipment having a battery voltage ranging from about 4.2 to about 4.5 V when fully charged. The voltage of the rechargeable battery system is maintained at between about 4.2 and about 4.5 V when fully charged, thereby preventing decomposition of the non-aqueous electrolyte of the lithium rechargeable battery and preventing thermal runaway at high temperatures, yielding high capacity and stability.

Figure 2:
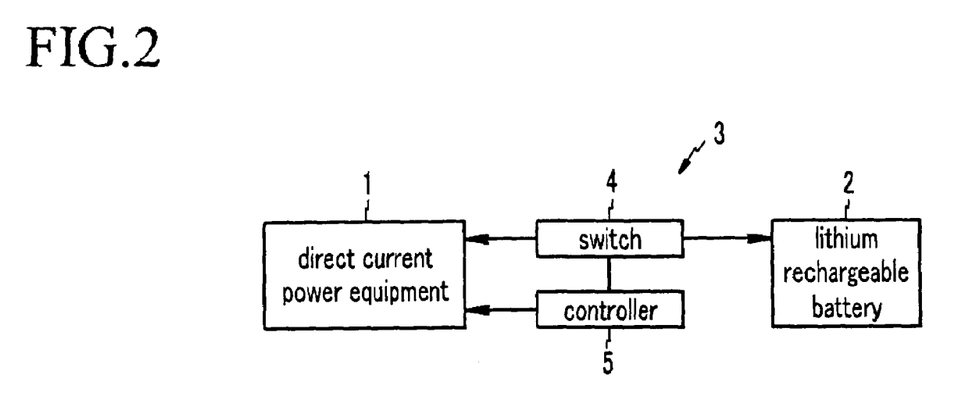
FIG. 2 is a schematic of a rechargeable battery system according to one embodiment of the present invention.

FIG. 2 shows one exemplary embodiment of a rechargeable battery system 3 according to the present invention. In FIG. 2, reference numeral 1 identifies the direct current power supply equipment, reference numeral 2 identifies a lithium rechargeable battery according to one embodiment of the present invention, reference numeral 4 identifies a switch positioned in a constant current circuit in series, and reference numeral 5 identifies a controller. The direct current power supply equipment 1 includes a device for adjusting the charge voltage and having a charge cut-off voltage ranging from about 4.2 to about 4.5 V. The controller 5 controls the switch 4. The controller 5 monitors the voltage of the battery 2, and the switch 4 controls the charge current by turning it on and off. The rechargeable battery system performs a constant current charge by using the switch 4 to supply the lithium rechargeable battery 2 with a charge current from the direct current power supply equipment 1. The system will maintain the constant current charge for a predetermined time by converting the constant current charge to a constant voltage charge when the battery voltage reaches the charge cut-off voltage, which ranges from about 4.2 to about 4.5 V. Accordingly, the voltage of the lithium rechargeable battery is maintained at about 4.2 to about 4.5 V when fully charged.

EXAMPLES

The following Experimental Examples illustrate the present invention in more detail. However, these examples are provided for illustrative purposes only and it is understood that the present invention is not limited by these Experimental Examples.

Experimental Example 1

A 3-electrode cell was prepared by adding a polymerizable aromatic compound or fluorinated organic compound to a non-aqueous electrolyte. The curved current-voltage line was then measured by a cyclic voltammogram. The reaction potential of the aromatic compound or the fluorinated organic compound was also measured.

The 3-electrode cell was fabricated by first preparing a working electrode made of a platinum wire having a diameter of 0.5 mm. A counter electrode and reference electrode made of lithium metal were also prepared.

An electrolyte solution was prepared by mixing $LiPF_6$ to a concentration of 1.3 mol/L to a solvent of ethylene carbonate (EC) and diethyl carbonate (DEC). The ratio of EC to DEC was 30:70. Four different electrolytes were prepared, Examples 1 through 3 and Comparative Example 1.

Example 1

A non-aqueous electrolyte was prepared by adding 0.2-weight % phenanthrene based on 100-weight % of the electrolyte solution.

Example 2

A non-aqueous electrolyte was prepared by adding 0.2-weight % m-terphenyl based on 100-weight % of the electrolyte solution.

Example 3

A non-aqueous electrolyte was, prepared by adding 10-weight % $CF_3CH_2OCOOCH_2CF_3$ based on 100-weight % of the electrolyte solution.

Comparative Example 1

A non-aqueous electrolyte was prepared by mixing EC, DEC, and $LiPF_6$. No other additive was used in this electrolyte.

A 3-electrode cell for each electrolyte was then assembled by injecting the non-aqueous electrolyte into a glass container and positioning the working electrode, the counter electrode, and the reference electrode around the non-aqueous electrolyte. Each assembled cell was allowed to stand at 25° C. for 15 hours, and its curved current-voltage line was measured by potential-scanning a 0.31 cm² working electrode at Open Circuit Voltage (about 3V (vs. Li)) to 8V (vs. Li) at a speed of 5 mV/sec, and then again at 8V (vs. Li) to 0V (vs. Li) at the same speed. The non-aqueous electrolyte including an aromatic compound was maintained at its peak potential for 8 hours during potential scanning.

The following Table 1 shows the current value and slope of the current-voltage curve at 7 V and the peak voltage at the maximum differential coefficient value of the curved current-voltage line. As shown in Table 1, the peak voltages in Examples 1 through 3 are higher than the peak voltage of Comparative Example 1, and the decomposition potential of the electrolyte solution increased due to the additive. Also, the current values of Examples 1 to 3 at 7 V are smaller than the current value of Comparative Example 1. Therefore, decomposition of the electrolyte solution in each of Examples 1 to 3 was suppressed to around 7 V by adding phenanthrene, m-terphenyl, or $CF_3CH_2OCOOCH_2CF_3$.

TABLE 1

| | Additive | Maintenance voltage | Voltage of 7 V | | Peak voltage (V) |
|---|---|---|---|---|---|
| | | | current (mA) | slope (dI/dE) | |
| Example 1 | phenanthrene | 4.20 V | 0.001 | 0.0017 | over 8 |
| Example 2 | m-terphenyl | 4.50 V | 0.001 | 0.0015 | over 8 |
| Example 3 | $CF_3CH_2OCOOCH_2CF_3$ | — | 0.005 | 0.013 | 7.5 |
| Comp. Example 1 | none | — | 0.008 | 0.022 | 7.3 |

Experimental Example 2

A coin-type lithium rechargeable battery was fabricated by adding a polymerizable aromatic compound or a fluorinated organic compound to a non-aqueous electrolyte, and its various battery characteristics were evaluated.

The lithium rechargeable battery was fabricated by first preparing a positive active material by mixing $LiNiO_2$ having an average particle diameter of 10 μm and $LiCoO_2$ having an average particle diameter of 10 μm. The ratio of $LiNiO_2$ to $LiCoO_2$ was 30:70. A positive active material comprising only $LiCoO_2$ was also prepared. A positive slurry was prepared by mixing the positive active material, a polyvinylidene fluoride binder, and a carbon powder conducting agent having an average particle diameter of 3 μm. N-methyl-2-pyrrolidone was then mixed with the positive slurry. The positive slurry was then coated with a doctor blade on a positive current collector comprising a 20 μm-thick aluminum film. The coated collector was then dried at 120° C. for 24 hours under vacuum to volatilize the N-methyl-2-pyrrolidone. After drying, the coated collector was pressed, yielding a positive electrode comprising a positive active material, a binder, and a conducting agent on a positive current collector.

A negative slurry was then prepared by mixing 95 parts by weight of an artificial graphite having an average particle diameter of 15 μm with 5 parts by weight of a polyvinylidene fluoride binder. N-methyl-2-pyrrolidone was then mixed in the slurry. The negative slurry was then coated with a doctor blade on a negative current collector comprising a 14 μm-thick Cu film. The coated collector was then dried at 120° C. for 24 hours under vacuum to volatilize the N-methyl-2-pyrrolidone. After drying, the coated collector was pressed, yielding a negative electrode comprising a negative active material and a binder on a negative current collector.

An electrolyte solution was prepared by adding $LiPF_6$ to a concentration of 1.3 mol/L to a solvent of ethylene carbonate (EC) and diethyl carbonate (DEC). The ratio of EC to DEC was 30:70. Eight electrolytes were then prepared, Examples 4 through 9 and Comparative Examples 2 and 3.

Example 4

A non-aqueous electrolyte was prepared by adding 0.2-weight % phenanthrene based on 100-weight % of the electrolyte solution.

Example 5

A non-aqueous electrolyte was prepared by adding 0.2-weight % 3,3'-dimethylbiphenyl based on 100-weight % of the electrolyte solution.

Example 6

A non-aqueous electrolyte was prepared by adding a mixture of 0.15 weight % phenanthrene and 0.05-weight % 3,3'-dimethylbiphenyl based on 100-weight % of the electrolyte solution.

Example 7

A non-aqueous electrolyte was prepared by adding a mixture of; 10 weight % $HCF_2CF_2CH_2OCF_2CF_2H$ based on 100-weight % of the electrolyte solution.

Example 8

A non-aqueous electrolyte was prepared by adding; 0.2 weight % m-terphenyl based on 100-weight % of the electrolyte solution.

Example 9

A non-aqueous electrolyte was prepared by adding 10 weight % $CF_3CH_2OCOOCH_2CF_3$ based on 100-weight % of the electrolyte solution.

Comparative Example 2

A non-aqueous electrolyte was prepared by adding nothing other than EC, DEC, and $LiPF_6$.

Comparative Example 3

A non-aqueous electrolyte was prepared by adding nothing other than EC, DEC, and $LiPF_6$.

A lithium rechargeable battery was prepared for each of Examples 4 to 9 and Comparative Examples 2 and 3 by disposing a porous polypropylene separator between the positive and negative electrodes, laminating the electrodes and separator together, housing the laminated unit in a coin-type battery case, injecting the non-aqueous electrolyte into the case, and closing and sealing the case. Each battery had a predetermined discharge capacity of 5 mAh. Table 2 shows the composition of each battery. As shown in Table 2, the battery of Comparative Example 2 includes a positive electrode having both $LiNiO_2$ and $LiCoO_2$, while Comparative Example 3 includes a positive electrode having only $LiCoO_2$.

TABLE 2

| | Additive | Positive electrode |
|---|---|---|
| Example 4 | phenanthrene | $LiNiO_2 + LiCoO_2$ (30:70) |
| Example 5 | 3,3'-dimethylbiphenyl | $LiNiO_2 + LiCoO_2$ (30:70) |
| Example 6 | phenanthrene 3,3'-dimethylbiphenyl | $LiNiO_2 + LiCoO_2$ (30:70) |
| Example 7 | $HCF_2CF_2CH_2OCF_2CF_2H$ | $LiNiO_2 + LiCoO_2$ (30:70) |
| Example 8 | m-terphenyl | $LiCoO_2$ |
| Example 9 | $CF_3CH_2OCOOCH_2CF_3$ | $LiCoO_2$ |
| Comparative Example 2 | none | $LiNiO_2 + LiCoO_2$ (30:70) |
| Comparative Example 3 | none | $LiCoO_2$ |

The resulting lithium rechargeable batteries were charged by repeating charge and discharge cycles twice, and the charged batteries were stored for 4 hours at 90° C. Discharge capacities after storage (retention capacities) were measured, and discharge capacities after one discharge and discharge cycle after storage (recovery capacities) were then measured.

In measuring the recovery capacity of each battery, the charge and discharge was performed first at a constant current charge of 0.5 C to reach between about 4.2 and about 4.5 V, then at a current voltage for 2 hours, and then at a constant current discharge of 0.2 C to reach about 3.0 V. Table 3 shows the retention capacity percentage and recovery capacity percentage of each battery based on 100% Open Circuit Voltage (OCV) and initial capacity.

TABLE 3

| | Charge voltage | Retention capacity | Recovery capacity |
|---|---|---|---|
| Example 4 | 4.20 V | 90% | 99% |
| Example 5 | 4.20 V | 82% | 94% |
| Example 6 | 4.20 V | 89% | 97% |
| Example 7 | 4.20 V | 78% | 96% |
| Example 8 | 4.50 V | 89% | 98% |
| Example 9 | 4.50 V | 78% | 95% |
| Comparative Example 2 | 4.20 V | 75% | 93% |
| Comparative Example 3 | 4.50 V | 73% | 91% |

As shown in Table 3, the lithium rechargeable batteries of Examples 4 through 9 had higher retention capacities and recovery capacities than those of Comparative Examples 2 and 3. The batteries of Examples 4 through 9 also had good high temperature characteristics. Particularly, the batteries of Examples 8 and 9 showed good high temperature characteristics at a charge voltage of 4.5 V.

Experimental Example 3

A cylindrical lithium rechargeable battery was prepared by adding an additive for improving the negative passivation film and a polymerizable aromatic compound or a fluorinated organic compound to a non-aqueous electrolyte, and its various battery characteristics were evaluated.

A lithium rechargeable battery was fabricated by first preparing positive and negative electrodes as in Experimental Example 2.

An electrolyte solution was then prepared by adding $LiPF_6$ to a concentration of 1.3 mol/L to a solvent of ethylene carbonate (EC) and diethyl carbonate (DEC). The ratio of EC to DEC was 30:70. Twelve non-aqueous electrolytes, Examples 10 through 18 and Comparative Examples 4 through 6, were then prepared by adding an additive for improving the negative passivation film and a polymerizable aromatic compound or a fluorinated organic compound. Comparative Examples 4 through 6 include only EC DEC and $LiPF_6$, without an additive. Table 4 lists the composition of each of Examples 10 through 18 and Comparative Examples 4 through 6.

A lithium rechargeable battery was prepared for each of Examples 10 through 18 and Comparative Examples 4 through 6 by disposing a porous polypropylene separator between the positive and negative electrodes, stacking the electrodes and the separator, cylindrically winding the stack, housing the stack in a cylindrical battery case, injecting the non-aqueous electrolyte into the case and sealing and closing the case. Each battery had a predetermined discharge capacity of about 2400 to about 2600 mAh. Table 4 shows the composition of each battery. In Table 4, FEC denotes fluoroethylene carbonate, and VC denotes vinylene carbonate.

TABLE 4

| | Aromatic compound or fluorinated organic compound | Additive for improving a negative passivation film | Positive electrode |
|---|---|---|---|
| Example 10 | phenanthrene (0.2 weight %) | FEC (3 weight %) VC (1 weight %) | $LiNiO_2 + LiCoO_2$ (30:70) |
| Example 11 | m-terphenyl (0.2 weight %) | none | $LiNiO_2 + LiCoO_2$ (30:70) |
| Example 12 | phenanthrene (0.2 weight %) | FEC (3 weight %) VC (1 weight %) | $LiNiO_2 + LiCoO_2$ (30:70) |
| Example 13 | $HCF_2CF_2CH_2OCF_2CF_2H$ (10 weight %) | FEC (4 weight %) $LiBF_4$ (0.15 weight %) | $LiNiO_2 + LiCoO_2$ (30:70) |
| Example 14 | m-terphenyl (0.2 weight %) | none | $LiCoO_2$ |
| Example 15 | $CF_3CH_2OCOOCH_2CF_3$ (10 weight %) | none | $LiCoO_2$ |
| Example 16 | $CH_3OCOOCH_2CHFCH_3$ (10 weight %) | FEC (5 weight %) VC (1 weight %) | $LiCoO_2$ |
| Example 17 | $CH_3OCOOCH(CH_3)CH_2F$ (10 weight %) | FEC (5 weight %) VC (1 weight %) | $LiCoO_2$ |
| Example 18 | $CH_3OCOOCH_2CH_2CH_2F$ (10 weight %) | FEC (5 weight %) VC (1 weight %) | $LiCoO_2$ |
| Comp. Example 4 | none | none | $LiNiO_2 + LiCoO_2$ (30:70) |
| Comp. Example 5 | none | none | $LiNiO_2 + LiCoO_2$ (30:70) |
| Comp. Example 6 | none | none | $LiCoO_2$ |

The resulting lithium rechargeable batteries were charged by repeating charge and discharge cycles twice and then stored at 90° C. for 4 hours to examine whether the current cut-off valve was operating. In addition, the lithium rechargeable batteries were charged by repeating charge and discharge cycles twice, stored at 150° C., and then examined for rupture. Table 5 shows the results of these measurements.

TABLE 5

| | Charge voltage | Current cut-off valve | Rupture experiment |
|---|---|---|---|
| Example 10 | 4.20 V | not operating | no rupture |
| Example 11 | 4.35 V | not operating | no rupture |
| Example 12 | 4.35 V | not operating | no rupture |
| Example 13 | 4.35 V | not operating | no rupture |
| Example 14 | 4.50 V | not operating | no rupture |
| Example 15 | 4.50 V | not operating | no rupture |
| Example 16 | 4.50 V | not operating | no rupture |
| Example 17 | 4.50 V | not operating | no rupture |
| Example 18 | 4.50 V | not operating | no rupture |
| Comparative Example 4 | 4.20 V | operating (after 7 hours) | rupture |
| Comparative Example 5 | 4.35 V | operating (after 3 hours) | rupture |
| Comparative Example 6 | 4.50 V | operating (after 35 minutes) | rupture |

As shown in Table 5, the current cut-off valves of the batteries of Comparative Examples 4 through 6 were operating, and the batteries ruptured when stored at 150° C. However, the current cut-off valves of the batteries of Examples 10 through 18 were not operating and the batteries did not rupture.

Experimental Example 4

Cylindrical lithium rechargeable batteries according to Examples 19 through 25 were prepared using electrolytes having either an additive for improving the negative passivation film or a mixture of an additive for improving the negative passivation film and an aromatic compound. A cylindrical lithium battery according to Comparative Example 7 was prepared using an electrolyte with no additive. Various characteristics of these batteries were evaluated.

The lithium rechargeable batteries were fabricated as in Experimental Example 3, except that the positive electrodes comprise only $LiCoO_2$, and the non-aqueous electrolytes are different. The composition of each non-aqueous electrolyte is listed in Table 6. In Table 6, FEC denotes fluoroethylene carbonate, VC denotes vinylene carbonate, PS denotes propanesultone, TFPMS denotes trifluoropropylmethylsulfone, FB denotes fluorobenzene, and TP denotes m-terphenyl. Each battery had a predetermined discharge capacity of 2600 mAh.

Charge and discharge were repeated 100 times, and the discharge capacities of the lithium rechargeable batteries were measured at the $100^{th}$ cycle.

Table 6 shows the discharge capacity percentage of each battery at the $100^{th}$ cycle based on 100% initial capacity.

TABLE 6

| | Additive | Charge-voltage | After $100^{th}$ cycle |
|---|---|---|---|
| Example 19 | FEC (2 weight %), VC (1 weight %) | 4.50 V | 97% |
| Example 20 | VC (1 weight %) | 4.50 V | 92% |
| Example 21 | PS (1 weight %) | 4.50 V | 96% |
| Example 22 | TFPMS (1 weight %) | 4.50 V | 93% |
| Example 23 | FB (5 weight %), FEC (5 weight %), VC (1 weight %) | 4.50 V | 95% |
| Example 24 | TP (0.2 weight %), FEC (5 weight %), VC (1 weight %) | 4.50 V | 95% |
| Example 25 | $CF_3CH_2OCOOCH_2CF_3$ (10 weight %), FEC (5 weight %), VC (1 weight %) | 4.50 V | 95% |
| Comp. Example 7 | none | 4.50 V | 88% |

As shown in Table 6, the batteries of Examples 19 through 25 have better cycle characteristics at high temperatures than the battery of Comparative Example 7. Therefore, the electrolytes and batteries of the present invention exhibit improved characteristics.

While this invention has been described in detail with reference to exemplary embodiments, those skilled in the art will appreciate that various modifications and substitutions can be made to the described embodiments without departing from the spirit and scope of the present invention as set forth in the appended claims.

What is claimed is:

1. A non-aqueous electrolyte for a lithium rechargeable battery, the electrolyte comprising at least one aromatic compound polymerizable at a potential ranging from about 4.2 to about 4.5 V, the aromatic compound being selected from the group consisting of phenanthrene, dimethylbiphenyl and mixtures thereof, wherein the aromatic compound is present in the electrolyte in an amount ranging from about 0.1 to about 0.5 weight % based on the total weight of the electrolyte.

2. The non-aqueous electrolyte of claim 1, further comprising an additive selected from the group consisting of fluoroethylene carbonate, vinylene carbonate, propanesultone, trifluoropropylmethylsulfone, fluorobenzene, $LiBF_4$ and mixtures thereof.

3. The non-aqueous electrolyte of claim 2, wherein the additive is present in the electrolyte in an amount ranging from about 0.05 to about 20 weight % based on the total weight of the electrolyte.

4. A non-aqueous electrolyte for a lithium rechargeable battery, the electrolyte comprising a fluorinated organic compound selected from the group consisting of compounds represented by Formula 2:

$$R^1\text{---}O\text{---}CO\text{---}O\text{---}R^2 \qquad (2)$$

wherein $R^1$ and $R^2$ are each selected from the group consisting of alkyl groups and fluoro alkyl groups, and the fluorinated organic compound is selected from the group consisting of  $CF_3CH_2OCOOCH_2CF_3$, $CH_3OCOOCH_2CHFCH_3$, $CH_3OCOOCH(CH_3)CH_2F$, $CH_3OCOOCH_2CH_2CH_2F$, and mixtures thereof.

5. The non-aqueous electrolyte of claim 4, wherein the fluorinated organic compound is present in the electrolyte in an amount ranging from about 0.1 to about 50 weight % based on the total weight of the electrolyte.

6. The non-aqueous electrolyte of claim 4, further comprising an additive selected from the group consisting of fluoroethylene carbonate, vinylene carbonate, propanesultone, trifluoropropylmethylsulfone, fluorobenzene, $LiBF_4$ and mixtures thereof.

7. The non-aqueous electrolyte of claim 6, wherein the additive is present in the electrolyte in an amount ranging from about 0.05 to about 20 weight % based on the total weight of the non-aqueous electrolyte.

8. A lithium rechargeable battery comprising the non-aqueous electrolyte according to claim 1.

9. A lithium rechargeable battery comprising:
   a positive electrode having a passivation layer formed by polymerization of an aromatic compound at a potential ranging from about 4.2 to about 4.5 V;
   a negative electrode comprising a negative active material; and
   the non-aqueous electrolyte according to claim 1.

10. A lithium rechargeable battery comprising the non-aqueous electrolyte according to claim 4.

11. A rechargeable battery system comprising:
    the lithium rechargeable battery of claim 8; and
    charging equipment having a cell voltage at full charge ranging from about 4.2 to about 4.5 V.

12. A rechargeable battery system comprising:
    the lithium rechargeable battery of claim 9; and
    charging equipment having a cell voltage at full charge ranging from about 4.2 to about 4.5 V.

13. A rechargeable battery system comprising:
    the lithium rechargeable battery of claim 10; and
    charging equipment having a cell voltage at full charge ranging from about 4.2 to about 4.5 V.

14. The non-aqueous electrolyte for a lithium rechargeable battery of claim 4, wherein the fluorinated organic compound is included in an amount of 0.1 to 10 weight %.

* * * * *

UNITED STATES PATENT AND TRADEMARK OFFICE
CERTIFICATE OF CORRECTION

PATENT NO.       : 7,611,801 B2  
APPLICATION NO.  : 11/250264  
DATED            : November 3, 2009  
INVENTOR(S)      : Yamaguchi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 358 days.

Signed and Sealed this

Twelfth Day of October, 2010

David J. Kappos  
*Director of the United States Patent and Trademark Office*